(12) United States Patent
Brookins

(10) Patent No.: US 10,028,453 B1
(45) Date of Patent: Jul. 24, 2018

(54) HIGH PRESSURE INDEXING VALVE

(71) Applicant: ZAP MOSQUITO SOLUTIONS INC., Miami, FL (US)

(72) Inventor: Keith Donald Brookins, Miami, FL (US)

(73) Assignee: ZAP MOSQUITO SOLUTIONS INC., Miami, FL (US)

( * ) Notice: Subject to any disclaimer, the term of this patent is extended or adjusted under 35 U.S.C. 154(b) by 0 days.

(21) Appl. No.: 15/431,039

(22) Filed: Feb. 13, 2017

(51) Int. Cl.
| | |
|---|---|
| A01G 25/16 | (2006.01) |
| A01C 23/00 | (2006.01) |
| A01C 23/04 | (2006.01) |
| A01M 7/00 | (2006.01) |

(52) U.S. Cl.
CPC .......... *A01G 25/165* (2013.01); *A01C 23/007* (2013.01); *A01C 23/047* (2013.01); *A01M 7/0089* (2013.01)

(58) Field of Classification Search
CPC .............................. A01G 25/165; A01C 23/007
See application file for complete search history.

(56) References Cited

U.S. PATENT DOCUMENTS

| | | | |
|---|---|---|---|
| 2,118,020 A | 5/1938 | Curtis | |
| 2,173,368 A | 9/1939 | Martin | |
| 2,344,335 A | 3/1944 | Wahlmark | |
| 2,713,900 A * | 7/1955 | Bloom | F16K 31/48 137/624.11 |
| 3,119,170 A | 1/1964 | Buck | |
| 3,419,336 A | 12/1968 | Kirk | |
| 5,284,299 A | 2/1994 | Medlock | |
| 5,699,781 A | 12/1997 | Johnson | |
| 5,934,885 A | 8/1999 | Farrell et al. | |
| RE36,378 E | 11/1999 | Mellette | |
| 7,296,760 B2 | 11/2007 | Alexander et al. | |
| D608,858 S | 1/2010 | Baltz et al. | |
| 8,486,155 B2 | 7/2013 | McAlister et al. | |
| 8,491,526 B2 | 7/2013 | Cronin et al. | |
| 8,770,496 B2 | 7/2014 | Altenburger | |
| 9,050,098 B2 | 6/2015 | Deville et al. | |
| 2014/0263690 A1 | 9/2014 | Eckman | |

FOREIGN PATENT DOCUMENTS

WO      2006054221 A1      5/2006

* cited by examiner

*Primary Examiner* — Kevin Lee
(74) *Attorney, Agent, or Firm* — Albert Bordas, P.A.

(57) ABSTRACT

A pressure indexing valve having an inlet assembly, a timer disk, a plunger assembly, a main body assembly, and an outlet assembly. The inlet assembly has an inlet endcap, a base, and a bypass housing which houses a ball, a ball return spring, and a set screw. The timer disk has flow thru-holes, an upper cam profile, and a lower cam profile. The plunger assembly has a piston, a plunger shaft, holes, and grommets. The main body assembly has a recess inset to receive the timer disk. The inlet assembly is secured onto the main body assembly to house the timer disk, and the plunger assembly. The outlet assembly has outlet passages, and outlet markers. The main body assembly is secured onto the outlet assembly.

19 Claims, 9 Drawing Sheets

HIGH PRESSURE INDEXING VALVE

BACKGROUND OF THE INVENTION

1. Field of the Invention

The present invention relates to indexing valves, and more particularly, to high pressure low volume indexing valves.

2. Description of the Related Art

Applicant believes that one of the closest references corresponds to U.S. Patent Application Publication No. 20140263690 published on Sep. 18, 2014 to Ron Eckman for Large Area Liquid Solution Application. However, it differs from the present invention because Eckman teaches a large area liquid solution application having a boom equipped with a series of removable spray nozzles, for cleaning and maintenance, attached to a standard truck trailer hitch receiver with a pump assembly attached onto a reservoir loaded onto a truck bed. A deicing apparatus sprays brine evenly on the pavement. The reservoir is secured manually with standard ratchet straps and the boom connects to any standard truck tow hitch without the use of tools. The equipment panel with attached pump is removable and the pump fittings and corresponding output hoses manually snap in and out of place to allow maintenance and cleaning. Communicating wirelessly, it is activated by a wireless key enabling a truck driver to control the system without needing to exit the vehicle and manually shut the sprayer.

Applicant believes that another reference corresponds to U.S. Pat. No. 9,050,098 issued to Deville, et al. on Jun. 9, 2015 for Cordless medical cauterization and cutting device. However, it differs from the present invention because Deville, et al. teaches a cordless cautery and cutting surgical device including a modular battery and a surgical handle. The battery has a cordless radio-frequency-signal-generation assembly generating an output radio-frequency signal and a first selectively removable connector part. The surgical handle has a first handle body portion with a bipolar cautery and cutting end effector. The end effector has jaws with bipolar contacts and a cutting blade disposed between the jaws. The handle has a second body portion connected to the first body portion, defines therein an aseptically sealable battery-holding compartment selectively exposed to the environment and removably holding therein the battery, and a second selectively removable connector part operable to removably hold the first connector part thereto. The second connector part has conductors electrically connecting the RF assembly to the bipolar contacts for supplying the radio-frequency signal to the bipolar contacts when the first and second connector parts are removably secured together.

Applicant believes that another reference corresponds to U.S. Pat. No. 8,770,496 issued to Gene P. Altenburger on Jul. 8, 2014 for Circuit for displaying the relative voltage at the output electrode of an electrostatically aided coating material atomizer. However, it differs from the present invention because Altenburger teaches a coating dispensing device having a trigger assembly for actuating the coating dispensing device to dispense coating material and a nozzle through which the coating material is dispensed. The coating dispensing device further has a source of voltage and a voltage multiplier for multiplying the voltage. The voltage multiplier is coupled to the source. An output terminal of the voltage multiplier is charged to a high-magnitude electrostatic potential and is adapted to charge coating material as the coating material is dispensed from the dispensing device. The coating dispensing device further has a circuit for providing a visual indication of the voltage at the output terminal. The circuit for providing a visual indication of the voltage at the output terminal has a first impedance across which a portion of the voltage at the output terminal appears and an amplifier. The output terminal of the amplifier is coupled to a light source for providing the visual indication of the voltage at the output terminal of the voltage multiplier.

Applicant believes that another reference corresponds to U.S. Pat. No. 8,491,526 issued to Cronin, et al. on Jul. 23, 2013 for Therapeutic cell applicator instrument with modular tips. However, it differs from the present invention because Cronin, et al. teaches a surgical device having a housing, a bioprocessing module, an end effector, and a pumping device. The bioprocessing module has media reservoirs, fluid conduits in communication with the reservoirs, and a port through which media is expelled. The end effector is configured for insertion into a lumen and delivering a tissue repair composition into that lumen. The end effector has at least one fluid conduit extending therethrough and at least one orifice in communication with the fluid conduit. The fluid conduit in the first end effector is in fluid communication with the port on the bioprocessing module. The pumping device is operable to urge a tissue repair composition having at least a portion of the contents of the media reservoirs through the fluid conduit of the first end effector such that the tissue repair composition is expelled from the at least one orifice.

Applicant believes that another reference corresponds to U.S. Pat. No. 8,486,155 issued to McAlister, et al. on Jul. 16, 2013 for Fistula repair plug having multiple layers. However, it differs from the present invention because McAlister, et al. teaches a surgical device operable to coextrude a multilayered biocompatible tissue repair plug in situ within a lumen in a patient. The device has a handle, a shaft extending from the handle, a plurality of conduits extending through the shaft, a plurality of media chambers, and an actuator. At least one of the media chambers has a suspension of at least one tissue fragment having at least one viable cell in a biocompatible carrier. The actuator is operable to cause media in each of the chambers to be urged through, and expelled from the orifice of, the conduit in communication therewith. The orifices are located at the distal end of the shaft such that media from the media chambers may be ejected into a lumen in a patient in order to form a multi-layered biocompatible tissue repair plug in situ. The conduits and their orifices are all coaxially aligned.

Applicant believes that another reference corresponds to U.S. Pat. No. 7,296,760 issued to Alexander, et al. on Nov. 20, 2007 for Indexing valve. However, it differs from the present invention because Alexander, et al. teaches a valve for controlling the flow of a gas or mixture of gases through a passageway in a coating material dispensing device that includes first and second valve portions. The first valve portion is adjustable with respect to the second valve portion selectively to adjust the flow through the passageway. One of the first and second valve portions has a first engagement member and the other of the first and second valve portions has a second engagement member. Engagement of the first and second engagement members indicates the relative orientation of the first and second valve portions.

Applicant believes that another reference corresponds to U.S. Pat. No. 5,934,885 issued to Farrell, et al. on Aug. 10, 1999 for Reagent pump assembly. However, it differs from the present invention because Farrell, et al. teaches a reagent pump assembly for metering precise volumes of fluids, such as reagent, for an analytical instrument, such as a clinical hematology or flow cytometer instrument. The assembly has a multilayer block having a plurality of diaphragm pumps interposed between two of the layers, controlled by application of one of vacuum or pressure, in sequence, to fill the reservoirs and expel the contents of the pump. One-way check valves are used to control the fluid flow from the reservoirs of fluids to the fluid outlet ports. The fluid outlet ports may be directly coupled to fluid inlet ports of a compatible unified flow circuit, which contains reaction chambers and a plurality of sample aliquots. The reagent pump assembly can be used to combine and mix sample aliquots with a precise amount of reagent in a reaction chamber, preparatory for analyzing the reaction mixture.

Applicant believes that another reference corresponds to U.S. Pat. No. 5,699,781 issued to Johnson, et al. on Dec. 23, 1997 for Rapid fire compressed air gun. However, it differs from the present invention because Johnson, et al. teaches an air compressed gun having a stock, a barrel, a trigger and a manual air pump. The gun also has a magazine having a series of barrels for holding several projectiles. An actuator indexes the magazine with each shot of the gun and automatically controls bursts of pressurized air. The actuator has a manifold having an inlet opening, an outlet opening and a firing opening, and a piston mounted within the manifold, which directs the flow of air therethrough for sequential firing.

Applicant believes that another reference corresponds to U.S. Pat. No. 5,284,299 issued to D. William Medlock on Feb. 8, 1994 for Pressure compensated HVLP spray gun. However, it differs from the present invention because Medlock teaches a HVLP spray gun capable of operating from a source of high pressure air. Compressed air is delivered to the gun through a relatively small diameter air hose. A pressure compensated control valve is mounted in the spray gun to reduce the air pressure delivered to an air/fluid nozzle to a predetermined pressure of no greater than 0.7 Kg/cm·sup·2 (10 psig). The control valve maintains a constant air pressure at the nozzle when either the atomization air flow rate is changed and/or the fan air flow rate is changed of the pressure of the source air changes.

Applicant believes that another reference corresponds to U.S. Pat. No. 3,419,336 issued to Norbert Kirk on Dec. 31, 1968 for Ball point pens. However, it differs from the present invention because Kirk teaches a barrel having a projectable and retractable ink cartridge and a projection-retraction mechanism separate and spaced from the inner end of the cartridge. A compression spring is interposed between the inner end of the cartridge and the projection-retraction mechanism to urge the cartridge outwardly and permit controlled inward movement thereof under application of writing pressure.

Applicant believes that another reference corresponds to U.S. Pat. No. 3,119,170 issued to William H. Buck, on Jan. 28, 1964 for Turret indexing control device. However, it differs from the present invention because Buck teaches a turret-controlling device for a machine tool and a hydraulic feeding apparatus wherein the relative approach of the work and the tool proceeds at various selected speeds corresponding in a predetermined manner with various positions of a turret.

Applicant believes that another reference corresponds to U.S. Pat. No. 2,344,335, issued to Gunnar A. Wahlmark, on Mar. 14, 1944 for Hydraulic transmission. However, it differs from the present invention because Wahlmark teaches a transmissions having a constant speed input shaft and adjustable speed output shaft. A transmission may be a hydraulic or fluid transmission embodying a variable displacement fluid motor, together with means for controlling the displacement of the pump and the displacement of the motor to obtain any one of a plurality of predetermined output or driven shaft speeds.

Applicant believes that another reference corresponds to U.S. Pat. No. 2,173,368 issued to A William H. Martin, on Sep. 19, 1939 for Welding machine. However, it differs from the present invention because Martin teaches a multi-welding machine having a plurality of welders which may be caused to operate in succession to progressively weld the parts of the work. It provides means for producing welder pressure periods of desired length and the flow of a welding current of desired amperage within the periods, and variation of the period length and amperage according to the physical or dimensional characteristics of the metal at the point or spot at which each of the welds are formed.

Applicant believes that another reference corresponds to U.S. Pat. No. 2,118,020 issued to Myron S. Curtis, on May 17, 1938 for Machine tool. However, it differs from the present invention because Curtis teaches a means of operating machine parts hydraulically by fluid pressure and controlling the operation electrically.

Applicant believes that another reference corresponds to U.S. Pat. No. D608,858 issued to Baltz, et al. on Jan. 26, 2010 for Coating material dispensing device. However, it differs from the present invention because Baltz, et al. teaches an ornamental design for a coating material dispensing device.

Applicant believes that another reference corresponds to U.S. Pat. No. RE36,378 issued to Robert R. Mellette, on Nov. 9, 1999 for High volume low pressure air spray gun. However, it differs from the present invention because Mellette teaches a high volume low pressure air spray gun having an atomizing air orifice for atomizing a stream of liquid coating material into a conical spray and opposed side port air orifices for flattening the spray into a fan-shaped pattern. The gun receives air at pressures up to about 100 psi, and an air flow restriction in the form of a venturi is in an air supply passage in the gun barrel. A valve stem for controlling the flow rate of air to the side port orifices extends through the venturi, and is configured to vary the venturi air flow area in response to changes in the flow rate of air to the side port orifices. When the valve stem is positioned for maximum air flow to the side port orifices, it establishes a maximum air flow area through the venturi, such that a high pressure of air at the gun air inlet, after flowing through the venturi, results in a high volume low pressure air flow at the atomizing and side port orifices. When the valve stem is positioned to reduce air flow to the side port orifices, it correspondingly reduces the flow area through the venturi to maintain the pressure of air at the atomizing orifice below a selected maximum value. The gun may carry a paint cup, in which case the cup is pressurized by air downstream from the venturi to prevent overpressurization of the cup.

Applicant believes that one of the closest references corresponds to WIPO Publication No. 2006054221 published on May 26, 2006 to Kevin L. Alexander for Indexing valve. However, it differs from the present invention because Alexander teaches a valve for controlling the flow of a gas or mixture of gases through a passageway in a coating material dispensing device includes first and second valve portions. The first valve portion is adjustable with respect to the second valve portion selectively to adjust the flow through the passageway. One of the first and second valve portions has a first engagement member and the other of the first and second valve portions includes a second engagement member. Engagement of the first and second engagement members indicates the relative orientation of the first and second valve portions.

Other patents describing the closest subject matter provide for a number of more or less complicated features that fail to solve the problem in an efficient and economical way. None of these patents suggest the novel features of the present invention.

SUMMARY OF THE INVENTION

The present invention is a high pressure low volume indexing valve, comprising an inlet assembly, a timer disk, a plunger assembly, a main body assembly, and an outlet assembly.

The inlet assembly comprises an inlet endcap, a base, and a bypass housing. The bypass housing houses a ball, a ball return spring, and a set screw.

The timer disk comprises flow thru-holes, an upper cam profile, and a lower cam profile. The upper cam profile and the lower cam profile each comprise exterior sides and inner sides.

The plunger assembly comprises a seal cap, a seal, a piston, a plunger shaft, holes, and grommets wherein the seal cap, and the seal are assembled with the piston. The piston comprises a concave piston section and the plunger shaft comprises a convex conical section. The convex conical section has less angle than the concave piston section to allow coupling at different angles for low friction rotation. The plunger shaft further comprises an upper contact pin, a lower contact pin, a spring and a spring shaft.

The timer disk is mounted onto the plunger assembly, and the upper contact pin contacts the upper cam profile for a rotational movement to align a respective of holes with a respective outlet passage of the outlet assembly. The lower contact pin contacts the lower cam profile.

The main body assembly comprises a recess inset to receive the timer disk. The main body assembly further comprises an index pin to align with an index orientation notch of the timer disk. The inlet assembly is secured onto the main body assembly to house the timer disk and the plunger assembly.

The outlet assembly comprises outlet passages, and outlet markers. The main body assembly is secured onto the outlet assembly.

It is one of the main objects of this invention to provide a high pressure low volume indexing valve It is another object of this invention to provide a high pressure low volume indexing valve, which is of a durable and reliable construction.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
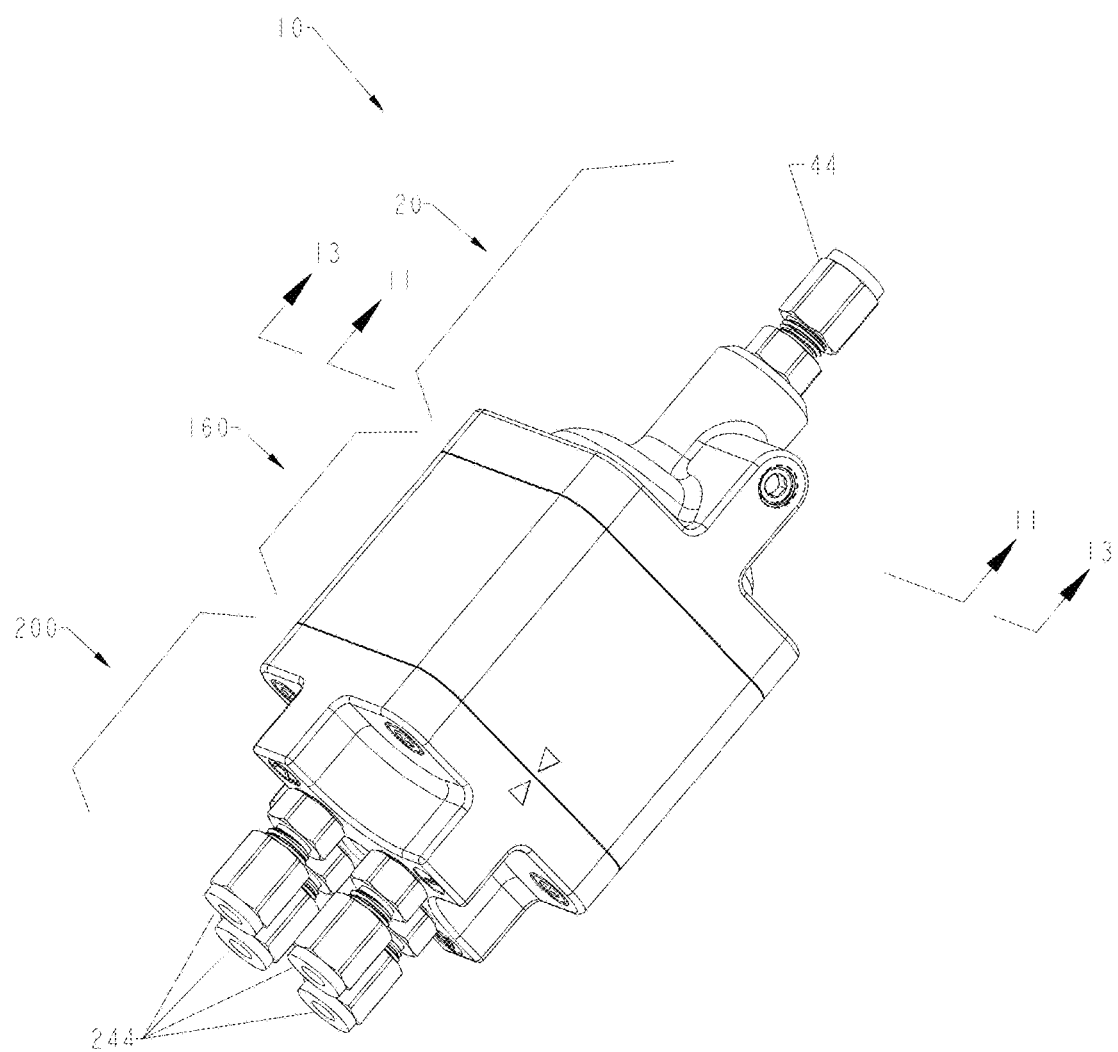
FIG. 1 represents an isometric view of the present invention.

Referring now to the drawings, the present invention is a high pressure low volume indexing valve and is generally referred to with numeral 10.

As seen in FIG. 1, present invention 10 comprises inlet assembly 20 having inlet fitting 44, main body assembly 160, and outlet assembly 200 having outlet fittings 244.

Figure 2:
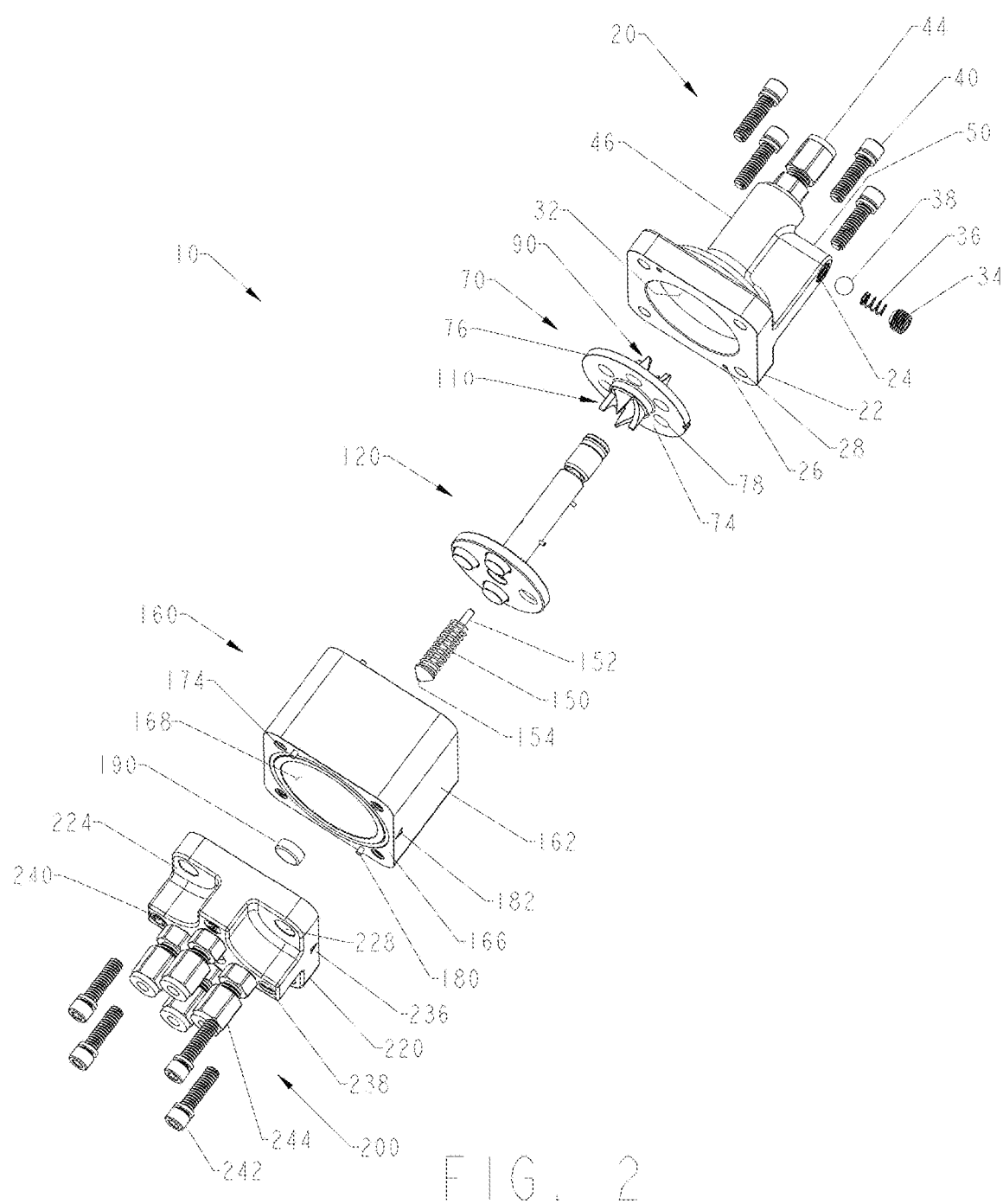
FIG. 2 represents an exploded view of the present invention.

As seen in FIG. 2, present invention 10 further comprises inlet assembly 20, timer disk 70, plunger assembly 120, main body assembly 160, and outlet assembly 200.

Inlet assembly 20 comprises inlet endcap 46, base 22, bolts 40, and bypass housing 50. Bypass housing 50 houses a pressure bypass comprising set screw 34, ball return spring 36, and ball 38.

Timer disk 70 comprises flow thru-holes 78, edge 76, upper cam profile 90, and lower cam profile 110.

Plunger assembly 120 comprises spring 150, and spring shaft 152 having convex conical point 154.

Main body assembly 160 comprises pins 180 protruding from outlet face 166, and sidewalls 162 to define cavity 168. Assembly marker 182 is positioned on one of sidewalls 162. Inlet assembly 20 is secured onto main body assembly 160 with bolts 40 to house timer disk 70 and plunger assembly 120.

Outlet assembly 200 comprises outlet markers 240 corresponding with respective outlet fittings 244. Outlet assembly 200 is secured onto main body assembly 160 with bolts 242.

In the illustrated embodiment, present invention 10 is designed as a 4-way high pressure low volume indexing valve, however, it is understood that present invention 10 may also be designed as a 3 or 5-way high pressure low volume indexing valve.

Figure 3:
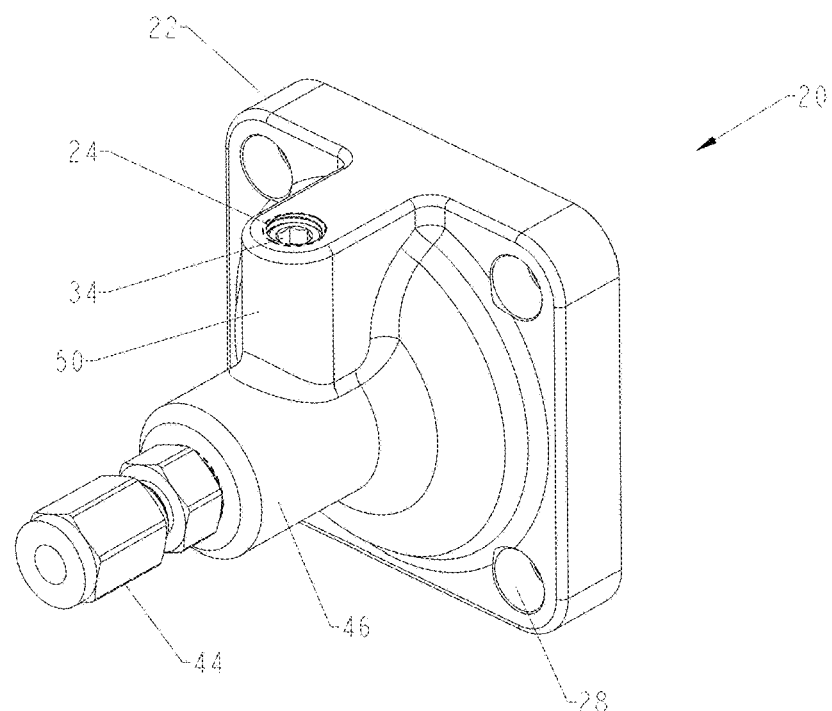
FIG. 3 represents a first isometric view of an inlet assembly.
Figure 4:
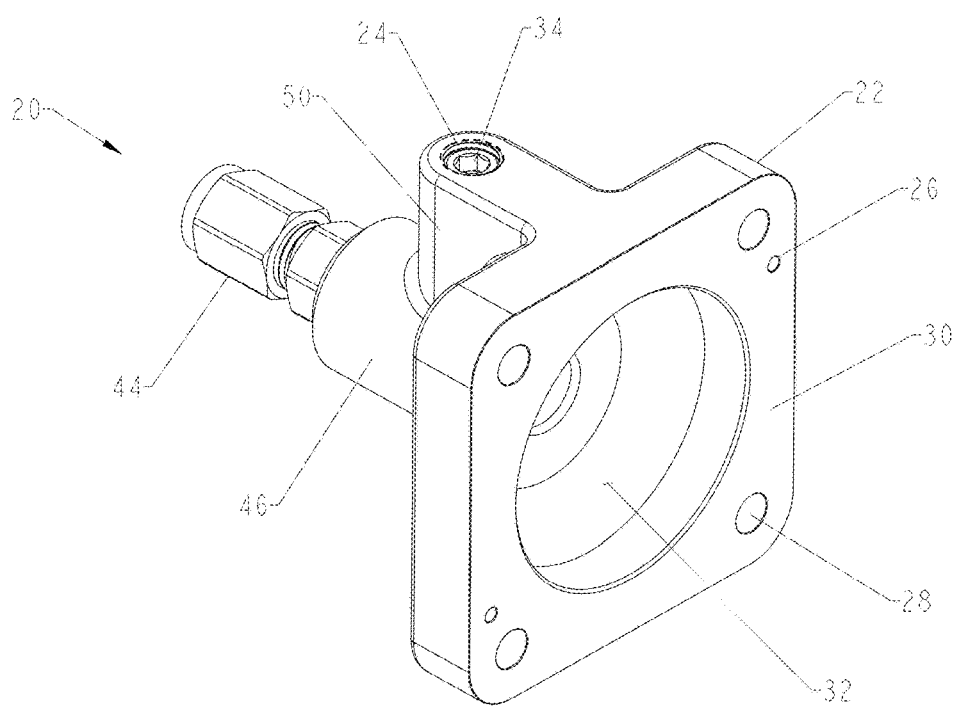
FIG. 4 represents a second isometric view of the inlet assembly.

As seen in FIGS. 3 and 4, inlet assembly 20 comprises set screw 34 that secures into bypass hole 24. Inlet assembly 20 further comprises orientation hole 26 and screw thru-holes 28 at lower face 30, and defines cavity 32. Mounted onto inlet endcap 46 is fitting 44.

Figure 5:
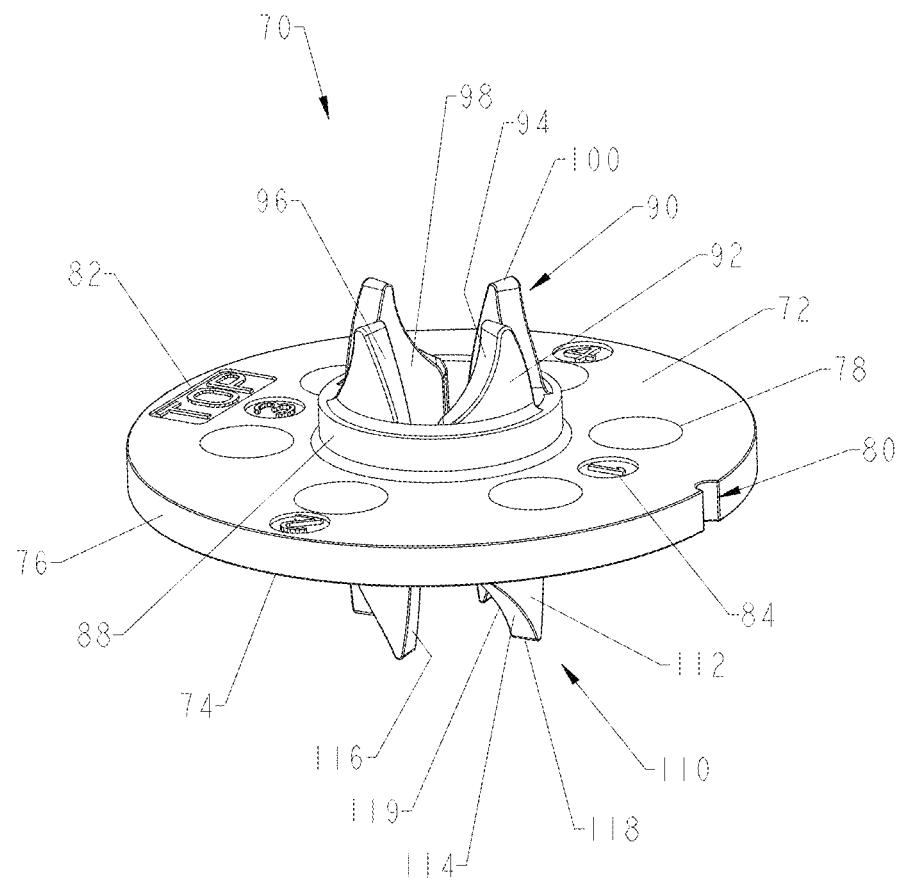
FIG. 5 represents an isometric view of a timer disk.

As seen in FIG. 5, timer disk 70 comprises disk upper face 72, disk lower face 74, marker 82, outlet markers 84, and cam profile base 88. In a preferred embodiment, upper cam profile 90 comprises exterior sides 92, inner curved edges 94, exterior curved edges 96, inner sides 98, and cam tops 100. Lower cam profile 110 comprises exterior sides 112, inner curved edges 114, exterior curved edges 116, cam tops 118, and inner sides 119. Timer disk 70 further comprises index orientation notch 80.

Figure 6:
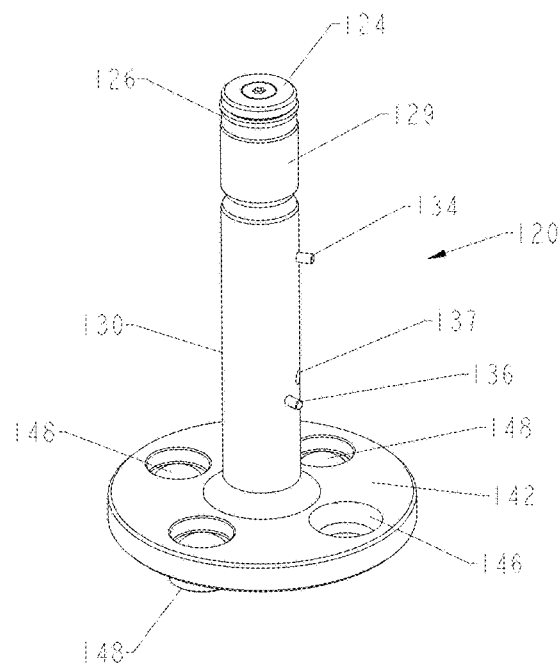
FIG. 6 represents an isometric view of a plunger assembly.
Figure 7:
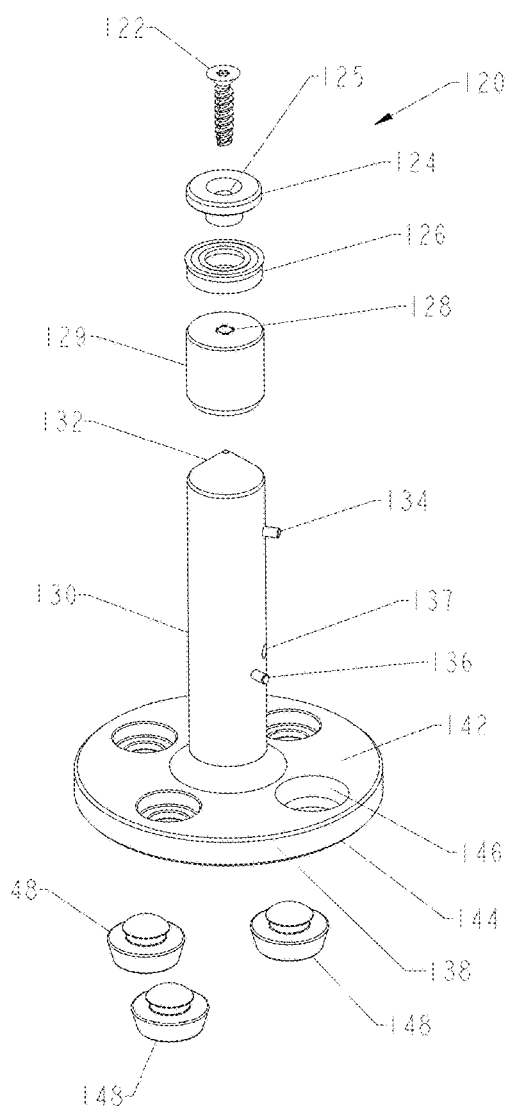
FIG. 7 represents an exploded view of the plunger assembly.

As seen in FIGS. 6 and 7, plunger assembly 120 is a two part assembly. Plunger assembly 120 comprises seal cap 124, seal 126, piston 129, plunger shaft 130, holes 146, and grommets 148. Seal cap 124 and seal 126 are assembled with piston 129. Screw 122 extends through seal cap hole 125 and seal 126 to secure into piston screw thru-hole 128. Plunger assembly 120 further comprises base 138 having base faces 142 and 144. Base 138 further comprises holes 146, and in a preferred embodiment, grommets 148 block all but one of holes 146. Protruding from base face 142 is plunger shaft 130. Upper contact pin 134 and lower contact pin 136 are approximately perpendicular to plunger shaft 130. Plunger shaft 130 further comprises convex conical section 132 and anti hydraulic lock weep hole 137.

Figure 8:
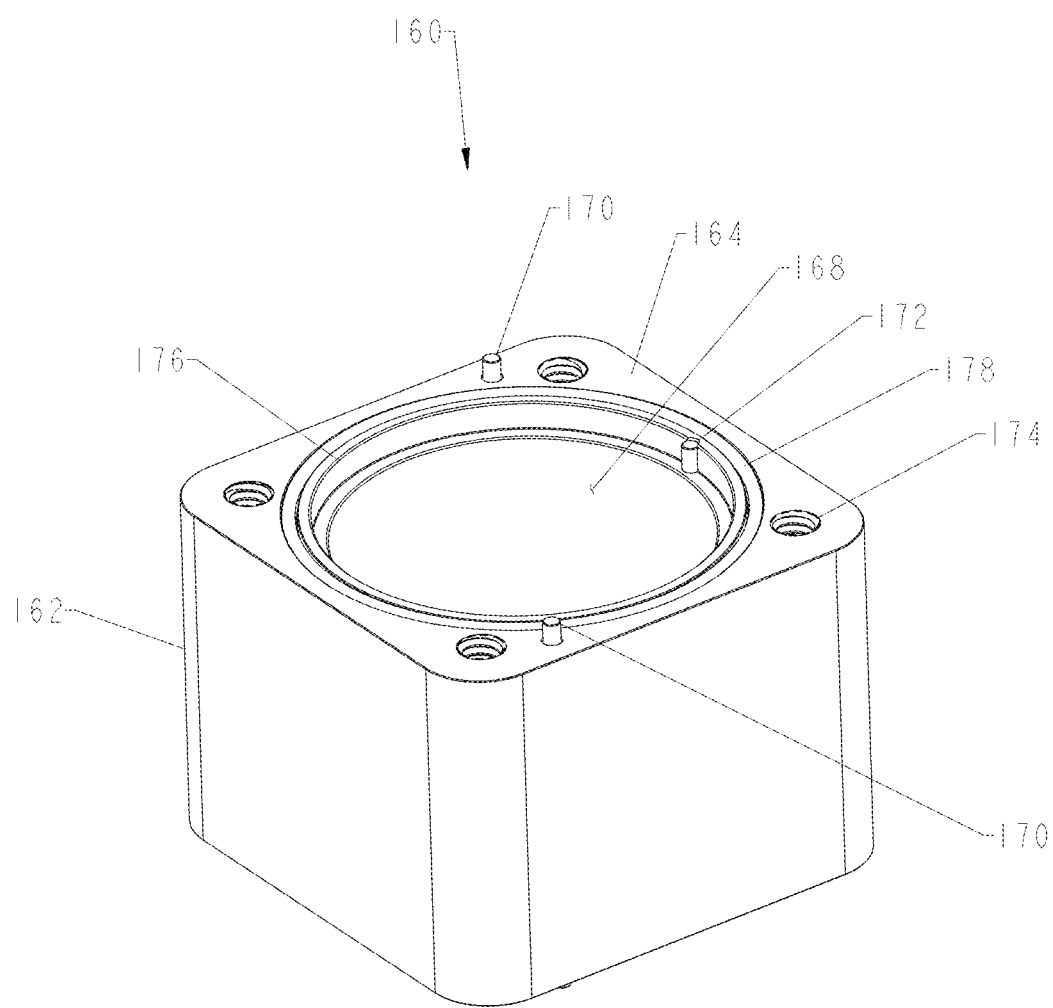
FIG. 8 represents an isometric view of a main body assembly.

As seen in FIG. 8, main body assembly 160 comprises inlet face 164 having tapped thru-holes 174. Protruding approximately perpendicularly from inlet face 164 are alignment pins 170 that align with orientation holes 26 of inlet assembly 20.

Main body assembly 160 further comprises recess inset 176 having o-ring 178 to receive timer disk 70. In addition, recess inset 176 comprises index pin 172 to align with and lock index orientation notch 80 of timer disk 70 as seen in FIG. 5. Main body assembly 160 defines cavity 168 to partially receive plunger assembly 120, seen in FIGS. 6 and 7.

Figure 9:
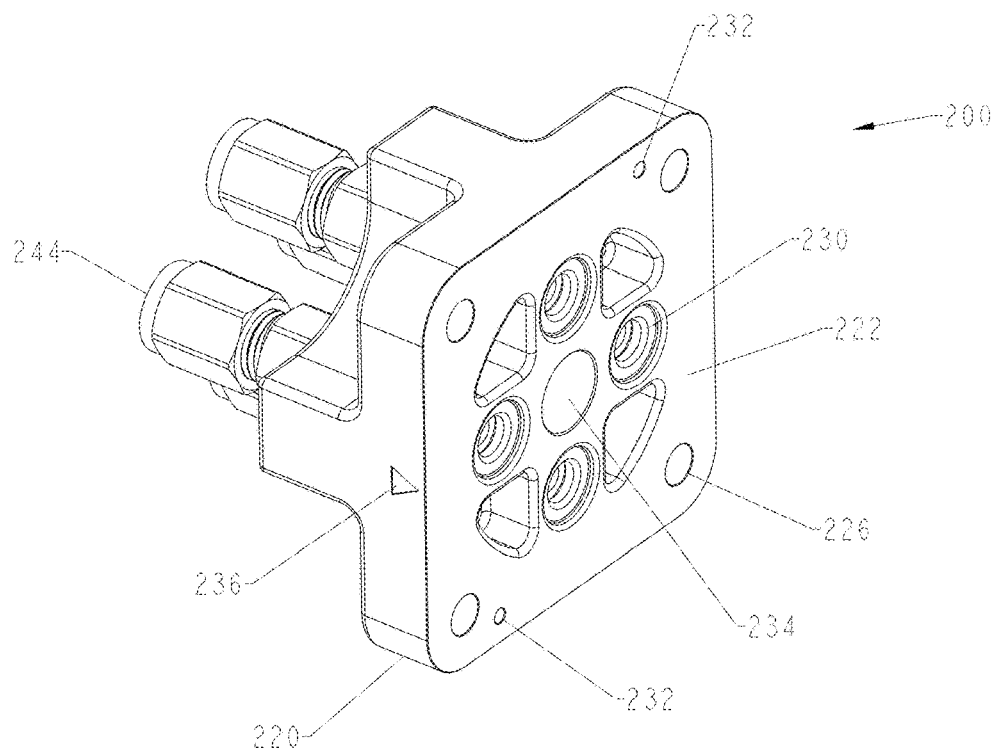
FIG. 9 represents a first isometric view of an outlet assembly.
Figure 10:
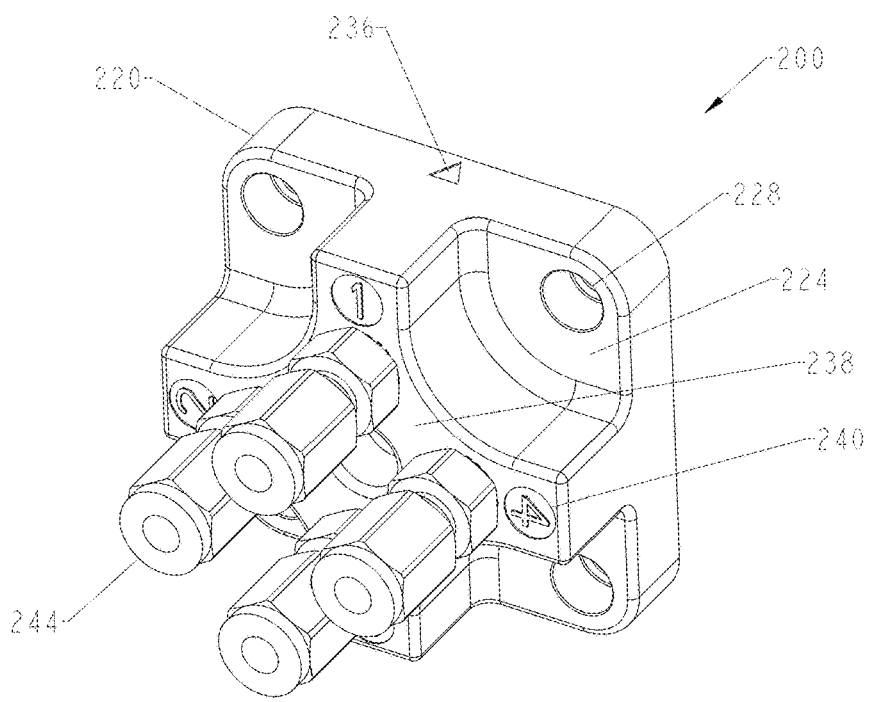
FIG. 10 represents a second isometric view of the outlet assembly.

As seen in FIGS. 9 and 10, outlet assembly 200 comprises upper face 222 having screw thru-holes 226. Alignment holes 232 align with pins 180 when outlet assembly 200 is secured onto main body assembly 160, seen in FIG. 2. Outlet assembly 200 further comprises outlet passages 230, and aperture 234 to receive base 190, seen in FIG. 2. Outlet assembly 200 further comprises outlet endcap 220 having assembly marker 236 that aligns with assembly marker 182 of main body assembly 160, seen in FIG. 2. Outlet assembly 200 further comprises bolt bases 224 having screw counterbores 228, and fitting base 238 for outlet fittings 244.

Figures 11, 12:
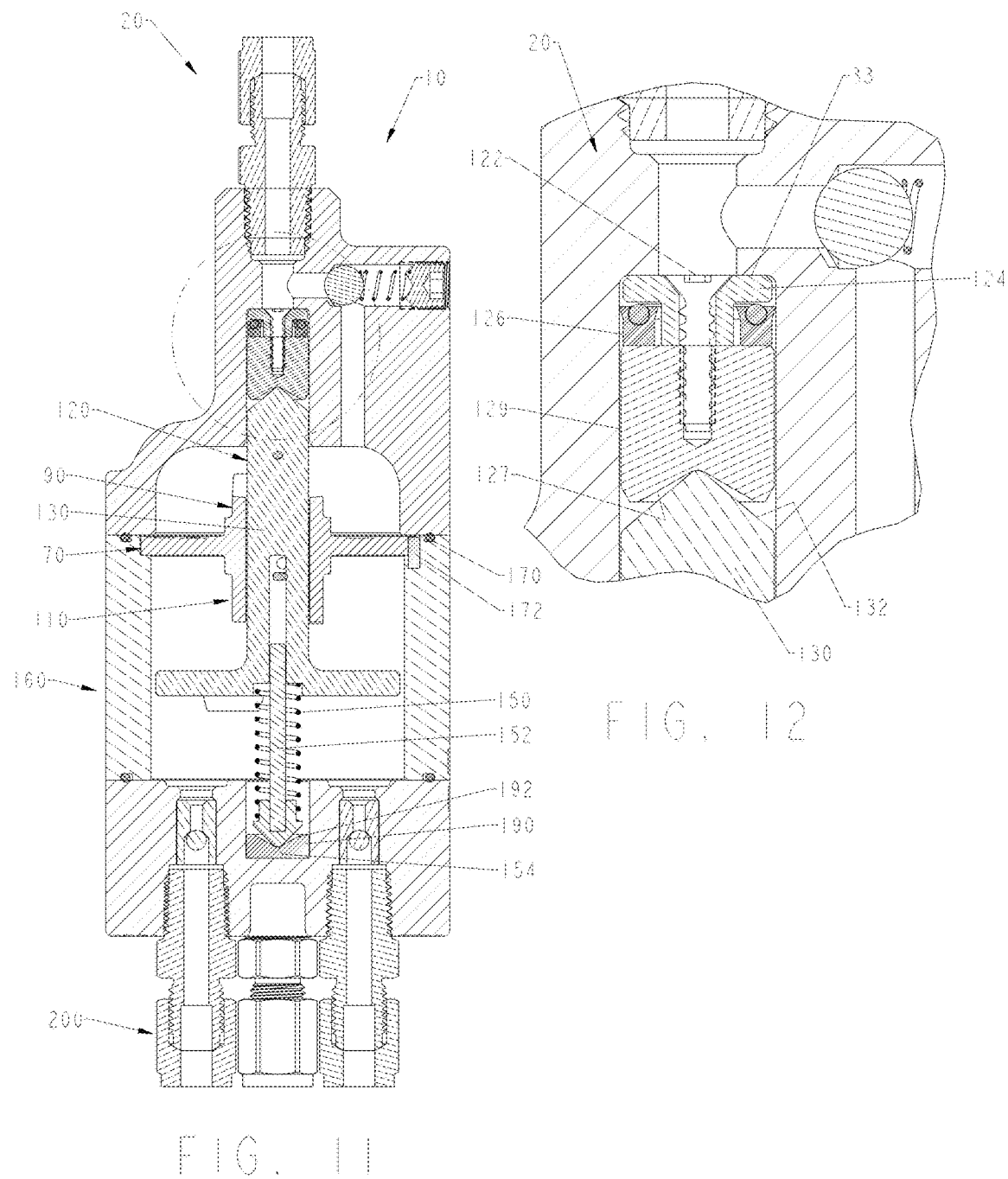
FIG. 11 is a cut view of the high pressure low volume indexing valve taken along the lines 11-11 as seen in FIG. 1, without pressure.
FIG. 12 is a close up view of a top section of the plunger assembly seen in FIG. 11.

As seen in FIGS. 11 and 12, timer disk 70 is mounted onto plunger assembly 120 and is locked in recess inset 176 by index pin 172, seen in FIG. 8. In the illustrated starting position defined by an absence of pressure or insufficient pressure, a spring force of spring 150 causes seal cap 124 to bias against stop wall 33, whereby convex conical point 154, of spring shaft 152, rests on base 190 having concave conical base section 192. As the spring force of spring 150 pushes piston 129 to the starting point, lower contact pin 136, seen in FIGS. 6 and 7, acts on lower cam profile 110, seen in FIG. 5, rotating plunger shaft 130 a first predetermined distance to a next cycle location. Each return to the start position rotates plunger shaft 130 the first predetermined distance to a next cycle location. Concave conical base section 192 has a first predetermined angle that is different from a second predetermined angle of convex conical point 154 to define a low friction point and allow rotation of plunger assembly 120.

Figures 13, 14:
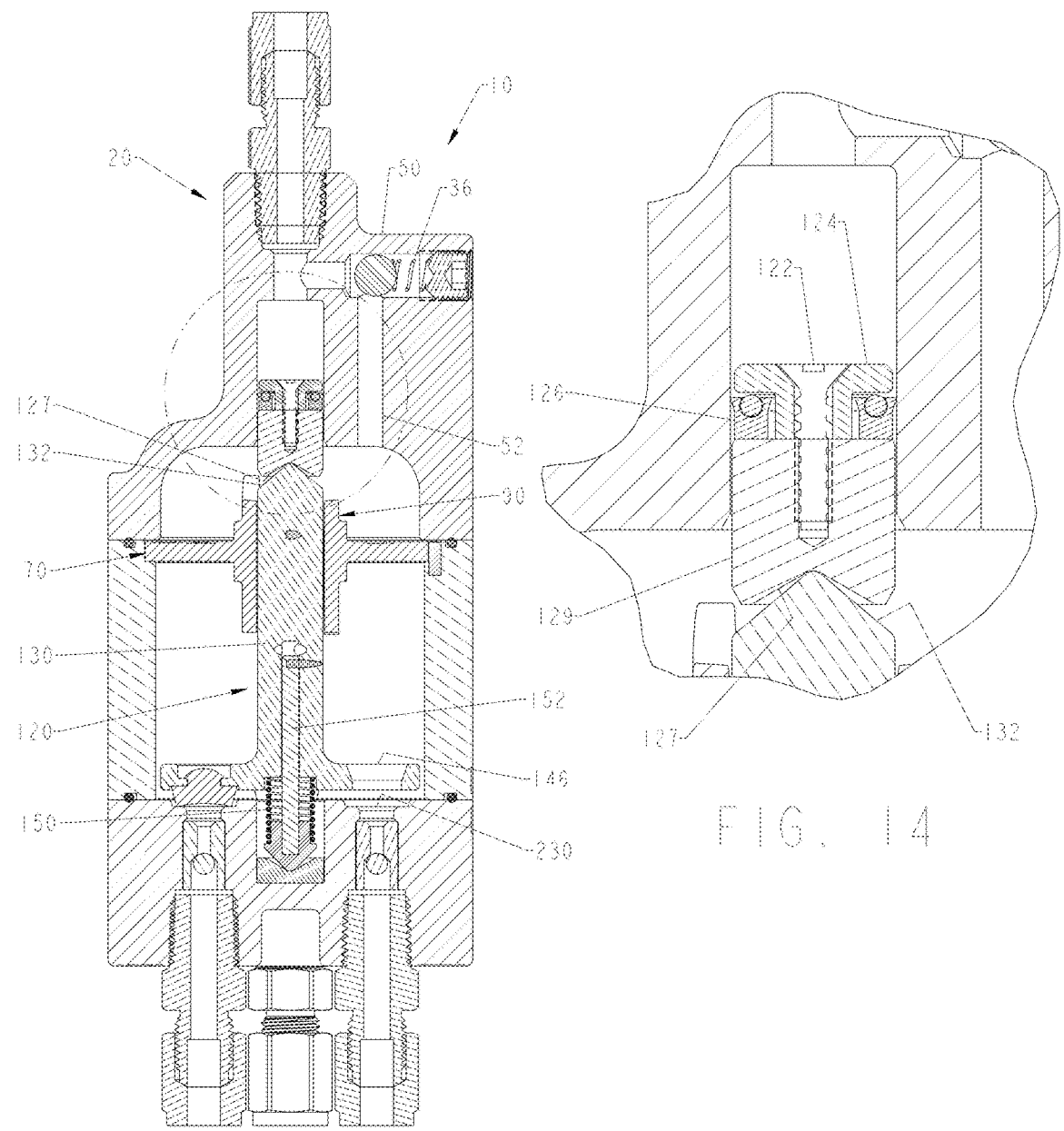
FIG. 13 is a cut view of the high pressure low volume indexing valve taken along the lines 13-13 as seen in FIG. 1, with a predetermined pressure.
FIG. 14 is a close up view of a top section of the plunger assembly seen in FIG. 13.

As seen in FIGS. 13 and 14, present invention 10 is illustrated in an operating position defined by a predetermined pressure overcoming the spring force of spring 150. Plunger shaft 130, pushed by piston 129, is moved away from inlet assembly 20. It is noted that piston 129 comprises concave piston section 127. Upon the predetermined pressure overcoming the spring force of spring 150, plunger shaft 130 rotates a second predetermined distance to complete the next cycle location, whereby upper contact pin 134, as seen in FIGS. 6 and 7, acts on upper cam profile 90, completing the second predetermined distance to align unblocked respective hole 146 with a respective of outlet passages 230. Thus, allowing fluid to flow through the unblocked respective hole 146. Outlet passages 230 are designed for high pressure low volume and are replaceable. Concave piston section 127 has a third predetermined angle that is different from a fourth predetermined angle of convex conical section 132 to define a low friction point and allow rotation of plunger assembly 120.

When in the operating position, excess fluid will flow to bypass housing 50 in the event that the excess fluid presents excess pressure beyond the predetermined pressure. Thus, overcoming a spring force of ball return spring 36 and permitting the excess fluid to travel through bypass channel 52.

In a preferred embodiment, present invention 10, defined as a high pressure low volume indexing valve, is utilized as a zone expander in an agricultural or garden setting with an irrigation system, and the fluid is water. The fluid may also comprise chemicals including, but not limited to, fertilizers and/or pesticides.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:
1. A pressure indexing valve, comprising:
   A) an inlet assembly comprising an inlet endcap, a base, and a bypass housing;
   B) a timer disk;
   C) a plunger assembly;
   D) a main body assembly; and
   E) an outlet assembly.
2. The pressure indexing valve set forth in claim 1, further wherein said bypass housing houses a ball, a ball return spring, and a set screw.
3. The pressure indexing valve set forth in claim 1, further wherein said timer disk comprises flow thru-holes, an upper cam profile, and a lower cam profile.
4. The pressure indexing valve set forth in claim 3, further wherein said upper cam profile and said lower cam profile each comprise exterior sides and inner sides.
5. The pressure indexing valve set forth in claim 3, further wherein said plunger assembly comprises a seal cap, a seal, a piston, a plunger shaft, holes, and grommets.
6. The pressure indexing valve set forth in claim 5, further wherein said seal cap and said seal are assembled with said piston.
7. The pressure indexing valve set forth in claim 5, further wherein said piston comprises a concave piston section.
8. The pressure indexing valve set forth in claim 7, further wherein said plunger shaft comprises a convex conical section, an upper contact pin, and a lower contact pin.

9. The pressure indexing valve set forth in claim 8, further wherein said convex conical section has less angle than said concave piston section to allow coupling at different angles for low friction rotation.

10. The pressure indexing valve set forth in claim 1, further wherein said timer disk is mounted onto said plunger assembly.

11. The pressure indexing valve set forth in claim 8, further wherein said upper contact pin contacts said upper cam profile for a rotational movement to align a respective of said holes with a respective outlet passage of said outlet assembly.

12. The pressure indexing valve set forth in claim 8, further wherein said lower contact pin contacts said lower cam profile.

13. The pressure indexing valve set forth in claim 1, further wherein said plunger assembly comprises a spring and a spring shaft.

14. The pressure indexing valve set forth in claim 1, further wherein said main body assembly comprises a recess inset to receive said timer disk.

15. The pressure indexing valve set forth in claim 1, further wherein said main body assembly further comprises an index pin to align with an index orientation notch of said timer disk.

16. The pressure indexing valve set forth in claim 1, further wherein said inlet assembly is secured onto said main body assembly to house said timer disk and said plunger assembly.

17. The pressure indexing valve set forth in claim 1, further wherein said outlet assembly comprises outlet passages.

18. The pressure indexing valve set forth in claim 1, further wherein said main body assembly is secured onto said outlet assembly.

19. The pressure indexing valve set forth in claim 1, further wherein said outlet assembly comprises outlet markers.

* * * * *